(12) United States Patent
Kelly et al.

(10) Patent No.: US 9,348,783 B2
(45) Date of Patent: May 24, 2016

(54) APPARATUS AND METHOD EMULATING A PARALLEL INTERFACE TO EFFECT PARALLEL DATA TRANSFER FROM SERIAL FLASH MEMORY

(71) Applicant: Lockheed Martin Corporation, Bethesda, MD (US)

(72) Inventors: Linette L. Kelly, Winter Park, FL (US); Carter Burks, Orlando, FL (US); Steven J. Melendez, Windermere, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 382 days.

(21) Appl. No.: 13/866,128

(22) Filed: Apr. 19, 2013

(65) Prior Publication Data
US 2013/0282945 A1    Oct. 24, 2013

Related U.S. Application Data

(60) Provisional application No. 61/635,415, filed on Apr. 19, 2012.

(51) Int. Cl.
*G06F 13/40*     (2006.01)
*G06F 9/44*     (2006.01)
*G06F 9/445*     (2006.01)

(52) U.S. Cl.
CPC .............. *G06F 13/40* (2013.01); *G06F 9/4401* (2013.01); *G06F 9/445* (2013.01); *G06F 9/4406* (2013.01)

(58) Field of Classification Search
CPC ... G06F 13/105; G06F 3/0601; G06F 3/0664; G06F 13/4018; G06F 13/1678; G06F 13/385; G06F 17/5027; G06F 2003/0694; G06F 9/4401; G06F 9/4406; G06F 9/445; H03M 9/00
USPC ............ 710/52, 57, 71; 703/24, 25, 27; 713/2
See application file for complete search history.

(56) References Cited

U.S. PATENT DOCUMENTS 6,742,063 B1 *  5/2004   Hellum et al. ................... 710/66
7,165,137 B2     1/2007   Chang et al.
7,376,767 B1 *  5/2008   Black et al. ...................... 710/52

(Continued)

FOREIGN PATENT DOCUMENTS

CN     101963936     2/2011
CN     201765585     3/2011

*Primary Examiner* — Glenn A Auve
(74) *Attorney, Agent, or Firm* — Terry M. Sanks, Esq.; Beusse Wolter Sanks & Maire, PLLC

(57) ABSTRACT

Apparatus and method emulating a parallel interface to effect parallel data transfer from serial flash memory are provided. A field-programmable gate array (FPGA) may be coupled to a processor via a data bus. A serial flash memory may be coupled to the FPGA via a serial interface. The FPGA may be programmed to emulate a parallel interface by converting a serial data stream of boot code or operating software received from the serial flash memory to a parallel data stream to effect parallel data transfer over the data bus to the processor. The FPGA may be responsive to respective logic signals set by the processor to start access to the serial flash memory by pointing to at least one predefined location corresponding to at least one starting address of data to be transferred to the processor without using a plurality of address lines to access the serial flash memory.

21 Claims, 3 Drawing Sheets

(56) References Cited

U.S. PATENT DOCUMENTS

| | | | |
|---|---|---|---|
| 7,689,402 B2* | 3/2010 | Naylor | 703/22 |
| 7,757,054 B2* | 7/2010 | Chen et al. | 711/154 |
| 7,822,958 B1* | 10/2010 | Allen et al. | G06F 9/4401 326/41 |
| 7,849,302 B2 | 12/2010 | Wu | |
| 8,185,728 B2 | 5/2012 | Lee et al. | |
| 2005/0283598 A1* | 12/2005 | Gaskins et al. | G06F 9/4403 713/2 |
| 2007/0260869 A1 | 11/2007 | Dade et al. | |
| 2009/0062945 A1* | 3/2009 | Trautmann et al. | 700/94 |

* cited by examiner

APPARATUS AND METHOD EMULATING A PARALLEL INTERFACE TO EFFECT PARALLEL DATA TRANSFER FROM SERIAL FLASH MEMORY

This application claims benefit of the Apr. 19, 2012 filing date of U.S. Provisional Application No. 61/635,415, titled "Enhanced Booting of Processor/FPGAs in a Confined Space", which is incorporated by reference herein.

TECHNICAL FIELD

Disclosed embodiments relate to computing devices, and, more particularly, to computing devices that may require an external memory to boot or configure.

BACKGROUND

Across a wide spectrum of computing applications involving signal processing, the growth in signal processing complexity can exceed the processing capabilities of stand-alone processor, such as without limitation, digital signal processors (DSPs), PowerPC™ processors and microprocessors. In some of these applications, one may use additional devices to meet the signal processing needs of a given application.

Field-programmable gate array (FPGA) co-processing is well-suited for such applications. When a FPGA chip is connected to a separate processor chip, an interface is needed. The interface selection between the processor and the FPGA may be driven by the application characteristics as well as the available interfaces on the processor. For example, interfaces available may include an external memory interface (EMIF) bus.

Known CCA-based computing devices generally involve a relatively large number of circuit board traces (e.g., copper traces including separate traces to deliver each bit in connection with data and addresses for the data). Due to physical separation (e.g., electrical isolation) that may be needed between the traces, this may result in a need of a relatively large footprint of the CCA, more complex trace analysis, as well as complexity of the CCA layout to avoid racing conditions.

Flash memory devices may be used in a variety of applications to store configuration, program, and/or memory data. Parallel flash memory transmits and receives a plurality of bits at a time, such as 16 or 32 bits. Parallel flash memory may be contrasted with serial flash memory which transfers data one bit at a time (per channel). Serial flash memory may permit a reduction in board space relative to parallel flash memory. However, for conventional computing devices having a processor and a separate FPGA, serial flash memory would result in a substantial loss of speed during a data transfer. In view of the foregoing considerations, it would be desirable to provide improved methodology and apparatus for effecting fast and reliable data transfer of boot code or operating software.

BRIEF SUMMARY

Generally, one non-limiting embodiment may provide apparatus including a field-programmable gate array (FPGA) coupled to a processor by way of a data bus. A serial flash memory may be coupled to the FPGA by way of a serial interface. The FPGA may be programmed to emulate a parallel interface by converting a serial data stream comprising boot code or operational software received from the serial flash memory to a parallel data stream to effect parallel data transfer over the data bus to the processor.

Another non-limiting embodiment may provide apparatus including a field-programmable gate array (FPGA) coupled to a processor by way of a data bus. A serial flash memory may be coupled to the FPGA by way of a serial interface. The FPGA may be programmed to emulate a parallel interface by converting a serial data stream comprising boot code or operational software received from the serial flash memory to a parallel data stream to effect parallel data transfer over the data bus to the processor. The FPGA may be responsive to respective logic signals set by the processor to start access to the serial flash memory by pointing to at least one predefined location corresponding to at least one starting address of data to be transferred to the processor without using a plurality of address lines to access the serial flash memory.

Still a further non-limiting embodiment may provide a method which allows coupling a field-programmable gate array (FPGA) to a processor by way of a data bus. Coupling a serial flash memory to the FPGA by way of a serial interface, and programming the FPGA to emulate a parallel interface by converting a serial data stream comprising boot code or operational software received from the serial flash memory to a parallel data stream to effect parallel data transfer over the data bus to the processor.

BRIEF DESCRIPTION OF THE DRAWINGS

Embodiments are explained in the following description in view of the drawings that show.

DETAILED DESCRIPTION

A CCA-based computing device embodiment may include a processor and a separate FPGA and may further include a single serial flash memory which may be used to boot both the FPGA and the processor, instead of a parallel flash memory and a separate serial flash memory. Improved FPGA firmware has been designed to reduce the boot time of the processor by booting the processor through the FPGA, where the firmware may be arranged to emulate (e.g., mimic) a parallel flash chip interface to speed data transfer, such as boot code or operating software, from the FPGA to the processor.

Figure 1:
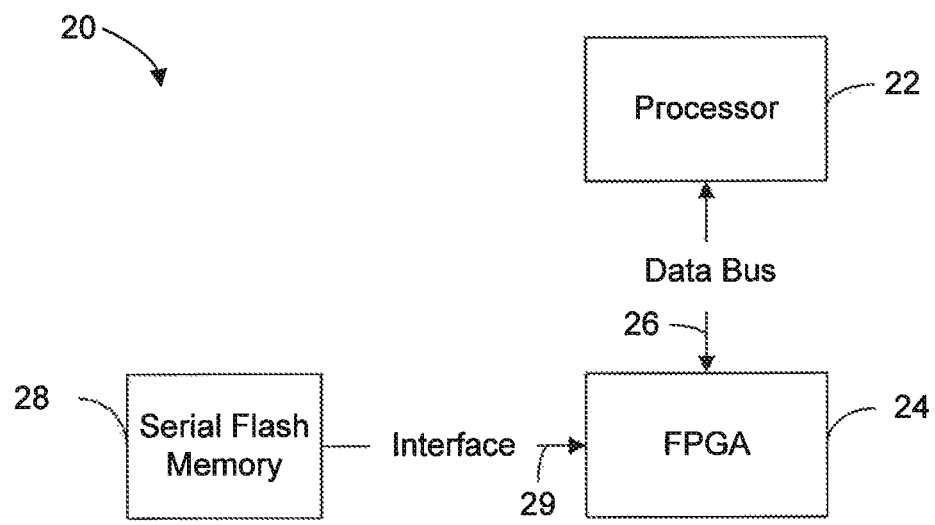
FIG. 1 is a block representation of a disclosed embodiment of an apparatus having a processor, a separate FPGA, and a serial flash memory.

FIG. 1 is a block representation of an embodiment of a computing device 20. Computing device 20 may include a processor 22 (such as a without limitation, a DSP) and a separate FPGA 24 coupled to one another by a data bus 26 (such as an EMIF bus), and a separate memory that may include a single serial flash memory 28 and may be implemented on a circuit card assembly (CCA), according to a non-limiting embodiment of the present invention. The lack of parallel flash memory in computing device 20 is noted, with the processor being coupled to flash memory 28 by way of FPGA 24, where FPGA 24 may be configured to boot processor 22. The FPGA may include a co-processor.

Serial flash memory 28 may comprise a NOR-based flash memory. Advantageous features of disclosed embodiments may be the ability to speed-up the boot process and simplify the routing design. By way of comparison NAND flash (as opposed to NOR flash) may involve relatively longer read access times. Moreover, an interface 29 between FPGA 24 and flash memory 28 may be a serial synchronous interface, such as a Serial Peripheral Interface (SPI). A benefit of a synchronous interface (as contrasted with an asynchronous interface) is faster data reads, less traces to route, and smaller footprint. FPGA 24 may be configured to reformat the serial synchronous data into a stream of parallel data, such as 16-bit or higher bit-width.

As will be appreciated by those skilled in the art, typical serial flash interfaces send one bit of data every clock cycle. However, in one non-limiting embodiment, interface 29 may be a quad SRI interface to maximize throughput by sending four bits of data every clock cycle. Therefore, in this embodiment the firmware algorithm may convert a synchronous quad. SPI to an asynchronous 16-bit (or higher) parallel.

Using a quad SPI to boot FPGA 24 and processor 22 saves costs on parts, traces and over 50% board space on the CCA as compared to conventional parallel booting. The firmware was found to address the slower boot times due to use of a serial interface, by having FPGA 24 convert a quad serial stream from the SPI flash to a 16 bit parallel stream, tricking processor 22 to function as if it was coupled to a standard parallel flash. This was found to make the boot time approximately at least three times faster than the standard SPI interface.

The description below elaborates details in connection with a process of a non-limiting embodiment, where the FPGA may be tasked to boot the processor from a serial flash while an internal boot loader of the processor expects a parallel stream of data, such as 16-bit wide, 32-bit wide, etc. Thus, the FPGA may be configured to emulate a parallel stream of data to the processor. Table 1 below lists respective logical states of two general purpose input/output GPIO FPGA pins (e.g., GPOIs (1, 2)) which may be set by the processor to determine respective modes of the FPGA for implementing the disclosed process. Table 2 below lists respective logical states of further FPGA GPIO pins (e.g., GPOIs (3, 4)) which may be set by the FPGA during the process.

TABLE 1

FPGA Logic Signals Set by Processor

| GPIO 2 | GPIO 1 | FPGA Mode | Description |
|---|---|---|---|
| 0 | 0 | Normal Memory Access | When both GPIOs are low, processor has access to standard memory map |
| 0 | 1 | Flash Buffer Access Only | Any change to GPIOs resulting in this state starts access to SPI flash at a predefined starting address location for operating software (OFP) |
| 1 | 0 | Flash Buffer Access Only | Any change to GPIOs resulting in this state starts access to SPI flash at a predefined starting address location for backup software (MLV) |
| 1 | 1 | Flash Buffer Access Only | Any change to the GPIOs resulting in this state (includes release from reset with pull-ups by CCA of GPIOs) starts access |

TABLE 1-continued

FPGA Logic Signals Set by Processor

| GPIO 2 | GPIO 1 | FPGA Mode | Description |
|---|---|---|---|
| | | | to the SPI at a at a predefined starting address location for Boot code. |

TABLE 2

FPGA Logic Signals for FPGA to SET

| GPIO | Description |
|---|---|
| GPIO 3 | When set High, inactive - Data has not been loaded into the buffer from the flash for boot, When set Low, active - FPGA has buffered a predefined number words (e.g., 256) and ready for the processor to read. |
| GPIO 4 | When set High, inactive - The FPGA is in boot mode When set Low, active - FPGA has released the EMIF bus out of boot mode and normal register accesses are permitted. |

Figure 2:
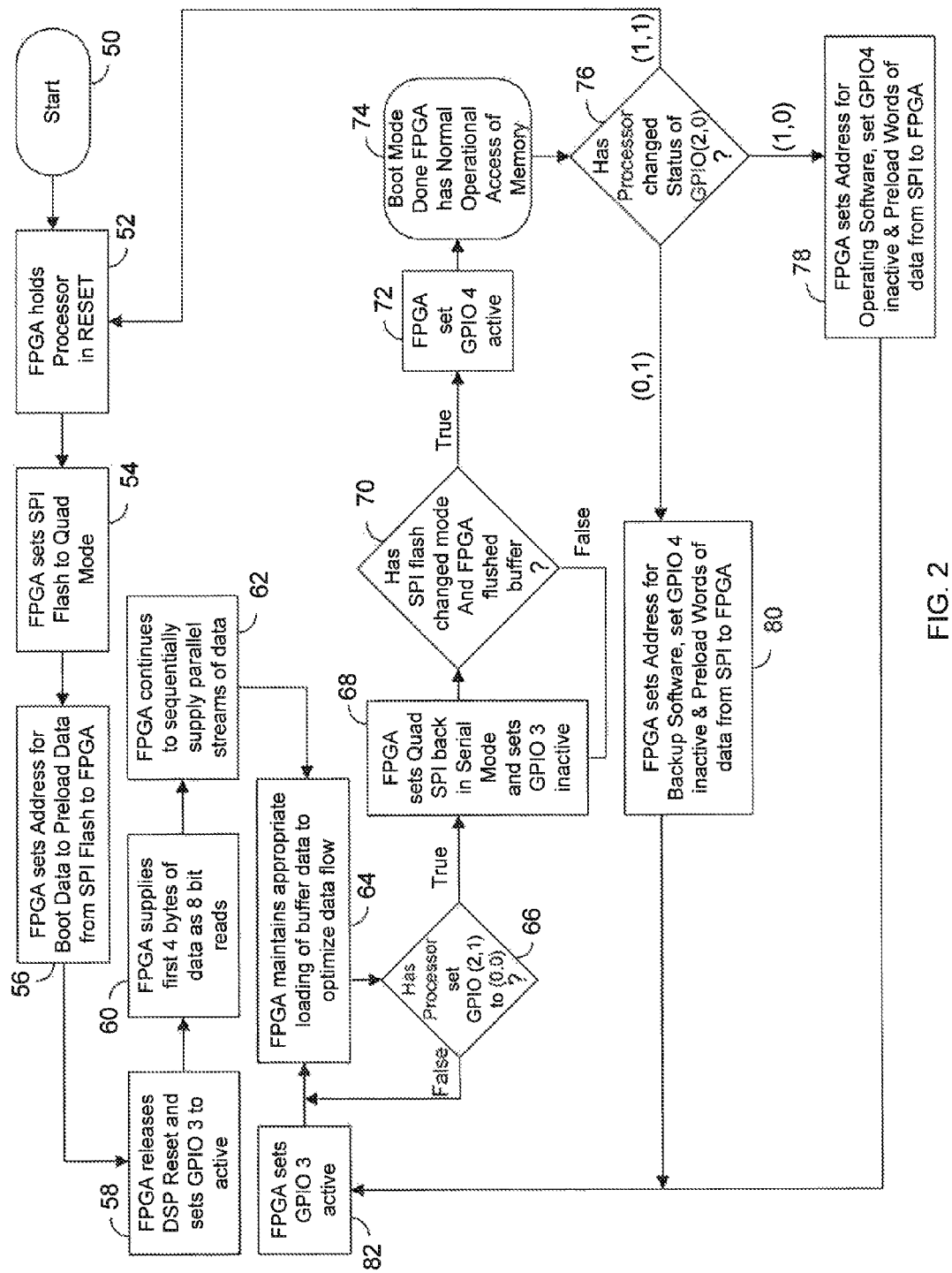
FIG. 2 is a flow chart depicting a process of a disclosed embodiment.

FIG. 2 is a flow chart depicting a process of a non-limiting embodiment. Presuming FPGA is active, and GPIOs (2, 1) have been set to (1, 1) so that, for example, GPIOs are tri-stated by the processor and pulled high by the CCA, then subsequent to a start step 50, as shown in block 52, FPGA holds processor in a reset condition. As shown in block 54, FPGA sets SPI flash to a quad mode. As shown in block 56, FPGA sets a predefined start address for boot data to start a preload of boot data from SPI to FPGA. As shown in block 58, FPGA releases processor out of the reset condition and sets GPIO 3 to an active status (See Table 2 above)

In one non-limiting embodiment, the FPGA may store the boot data in a data buffer, (e.g., circular buffer 4-bits wide or more), for the processor boot loader to sequentially access parallel streams of boot data (e.g., such as 16-bits or 32-bits at a time). To handle a special case of the processor in connection with the first word being accessed by the processor, as illustrated in block 60, FPGA may provide the first four bytes of data as 8-bit reads, and then as shown in block 62, FPGA continues to sequentially read parallel streams of data, such as 16-bits, 32-bits wide, etc.

As shown in block 64, the FPGA may be configured to control an appropriate loading of the buffer to ensure optimized data flow as the processor requests data. In one non-limiting embodiment, accesses to the buffer may be automatically incremented by way of strobes (e.g., rd_en strobes). The FPGA may release the processor from reset when the buffer registers a predefined target number of words (e.g., 256 words of data, 4 pages of data) to reduce the possibility of sending repeat data to the processor during boot. The FPGA may provide data flow control by way of a WAIT line on the EMIF bus to ensure fresh data (not repeat data) is supplied to the processor. If the data in the buffer is below a lower range threshold (e.g., approximately 2 pages of data), then one may command a number of wait cycles (e.g., 52 wait cycles) to the EMIF bus with respect to the processor. This equates to 64 wait states with respect to a processor operating at a non-limiting example clocking rate of 125 MHz. Once the FPGA detects a sufficient refilling of data stored in the buffer (e.g., 3 pages or more), then the FPGA can stop the wait states.

If the buffer reaches an upper range threshold (e.g., 5 pages) of stored data, then one may halt reading the SPI flash until the amount of data in the buffer falls below 4 pages as seen in Table 3 below regarding Management of the data buffer.

TABLE 3

Data Buffer Management

| Number of words in Buffer | Action |
|---|---|
| Target Number Reached (e.g., 256 Words, 4 pages) | Remove Reset |
| Below Lower End Threshold (e.g., 127 Words, 2 pages) | Add wait states to EMIF Bus |
| Refill Target Reached (e.g., 193 Words, 3 pages) | Remove wait states |
| Reaches Upper End Threshold (e.g., 320 Words, 5 pages) | Stop reading from SDI Flash, continue reading when data in buffer decreases to target number (e.g., four pages) |

As shown in decision block 66, further iterations of data loading may be performed at block 64 till processor sets GPIOs (2,1)=0,0. In this case, as shown in block 68, FPGA sets quad SPI flash in a serial mode and sets GPIO 3 to an inactive status. As shown in decision block 70, a further iteration will be performed at block 68 till SPI flash has changed mode and FGPA has emptied its buffer. In this case, as shown in block 72, FGPA sets GPIO 4 to an active status and continues to block 74, indicating boot mode is done and FGPA resumes normal operational access to memory.

Decision 76 evaluates Whether processor has set GPIOs (2,1) to one of three choices: (0,1); (1,0) or (1,1). If processor has set GPIOs (2,1) to (1,1), then the process returns to block 52 in connection with a further access of boot data. If processor .has set GPIOs (2,1) to (1,0), then the process continues at block 78, where FPGA sets an initial address for accessing operating software, sets GPIO 4 to an inactive status and preloads a number of words (e.g., 256) of data from SPI flash to FGPA. If processor has set GPIOs (2,1) to (0,1), then the process continues at block 80, where FPGA sets an address for backup software, sets GPIO 4 to an inactive and preloads a number of words (e.g.,256) of data from SPI flash to FGPA and continues to block 82 where FGPA sets GPIO 3 to an active status prior to continuing to block 74.

Figure 3:
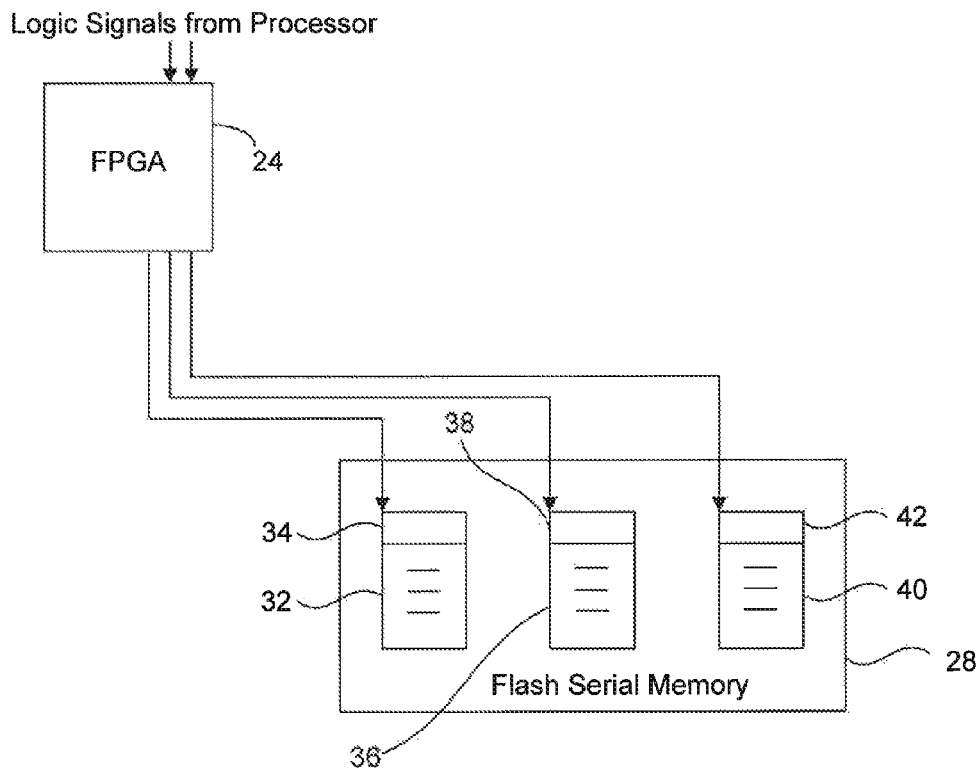
FIG. 3 is a block, diagram illustrating certain aspects of an embodiment in connection with selectable address jumps, which allow data transfers without involvement of parallel data addresses.

FIG. 3 is a block diagram illustrating certain aspects of an embodiment in connection with programmable address jumps, which allow data transfers without involvement of parallel data addresses. In one non-limiting embodiment, FPGA 24 may be programmed to be responsive to respective logic signals set by the processor (see Table 1) to start accessing data in serial flash memory 28 by pointing (e.g., jumping) to at least one predefined location corresponding to at least one starting address of the data without using a plurality of address lines to access the data. For example, block 32 may represent boot data and location 34 may correspond to a starting address for boot data 32. As listed in Table 1, when GPOIs (2, 1) are set by processor to 1,1, then the processor will start accessing data at location 34 and will continue to sequentially access such data without having to use a plurality of address lines. In a second non-limiting example, block 36 may represent operational software and location 38 may correspond to a starting address for the operational software. In this case, when GPOIs (2, 1) are set by processor to 0,1, then the processor will start accessing operational software data at location 38 and will continue to sequentially access such operational software without having to use address lines. In a third non-limiting example, block 40 may represent backup software and location 40 may correspond to a starting address for the backup software. In this case, when GPOIs (2, 1) are set by processor to 1,0, then processor will start accessing data at location 40 and will continue to sequentially access such operational software without having to use address lines. In one non-limiting example embodiment, the predefined location may be based on a type of data to be transferred. This embodiment may provide at least the following advantages. For example, not having to use address lines (e.g., parallel address lines) further reduces the number of traces in the CCA and thus further saves costs on parts, traces and board space on the CCA, as compared to conventional parallel addressing. Additionally, not having to wait for processing of parallel address data substantially reduces the time used to implement data transfers.

Figure 4:
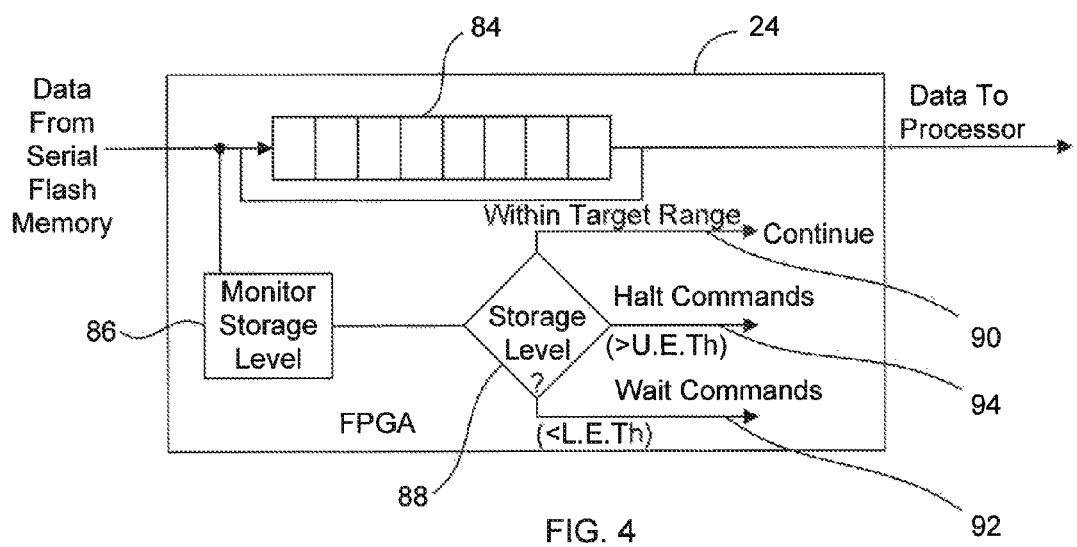
FIG. 4 is a block diagram illustrating further aspects of an embodiment in connection with management of a data buffer coupled to receive data being accessed by the processor from the serial flash memory.

FIG. 4 is a block diagram illustrating further aspects of an embodiment regarding a data buffer 84 (e.g., a circular data buffer) coupled to receive data being accessed by the processor from the serial flash memory. It is noted that the amount and/or speed at which data is requested from the serial flash is driven by the processor. In one non-limiting example, FPGA 24 may be configured to provide flow control to data being requested by the processor. The storage level of buffer 84 may be monitored, as illustrated in block 86. If decision block 88 determines that the storage level of buffer 84 (e.g., a number of data words) is below a Lower End Threshold (e.g., <L.E.Th), then FPGA 24 may issue a plurality of wait commands 92 to the data bus until the number of words in the data buffer refills to a predefined number of words. See Table 3. If decision block 88 determines that the storage level of buffer 84 is above an Upper End Threshold (e.g., >U.E.Th) then FPGA 24 may issue a plurality of halt commands 92 to halt reading of data from flash memory until the number of words in the data buffer has been reduced to a predefined number of words. If decision block 88 determines that the storage level of buffer 84 is within a target level, then data transfer to processor will continue, as requested by the processor. This allows keeping data ready for the processor regardless of the speed at which data may be requested by the processor from the serial flash.

While various embodiments have been shown and described herein, it will be apparent that such embodiments are provided by way of example only. Numerous variations, changes and substitutions may be made without departing from the embodiments herein. Accordingly, it is intended that such embodiments be limited only by the spirit and scope of the appended claims.

The invention claimed is:

1. Apparatus comprising:
   a processor;
   a field-programmable gate array (FPGA) coupled to the processor by way of a data bus; and
   a serial flash memory coupled to the FPGA by way of a serial interface,
   wherein the FPGA is programmed to emulate a parallel interface by converting a serial data stream comprising boot code or operating software received from the serial flash memory to a parallel data stream to effect parallel data transfer over the data bus to the processor; and the FPGA to provide flow control to data being requested by the processor by monitoring a storage level of a data buffer coupled to receive the data being accessed from the serial flash memory.

2. The apparatus of claim 1, wherein the serial flash memory comprises a NOR-based serial flash memory.

3. The apparatus of claim 1, wherein the data bus comprises an external memory interface (EMIF) bus.

4. The apparatus of claim 1, wherein the serial interface comprises a serial peripheral interface (SPI).

5. The apparatus of claim 4, wherein the serial interface comprises a quad SPI.

6. The apparatus of claim 1, wherein the FPGA is responsive to respective logic signals set by the processor to start access to the serial flash memory by pointing to at least one predefined location corresponding to at least one starting address of data to be transferred to the processor without using a plurality of address lines to access the serial flash memory.

7. The apparatus of claim 6, wherein said least one predefined location is based on a type of data to be transferred.

8. The apparatus of claim 1, wherein, when a number of words in the buffer is below a lower range threshold, the FPGA issues a plurality of wait commands to the data bus until the number of words in the data buffer refills to a predefined number of words.

9. The apparatus of claim 8, wherein, when a number of words in the buffer is above an upper range threshold, the FPGA issues a plurality of halt commands until the number of words in the data buffer is reduced to a predefined number of words.

10. A circuit card assembly comprising the apparatus of claim 1.

11. The circuit care assembly of claim 10, wherein the FPGA is responsive to respective logic signals set by the processor to start access to the serial flash memory by pointing to at least one predefined location corresponding to at least one starting address of data to be transferred to the processor without using a plurality of address lines to access the serial flash memory.

12. Apparatus comprising:
a processor;
a field-programmable gate array (FPGA) coupled to the processor by way of a data bus; and
a serial flash memory coupled to the FPGA by way of a serial interface,
wherein the FPGA is programmed to emulate a parallel interface by converting a serial data stream comprising boot code or operating software received from the serial flash memory to a parallel data stream to effect parallel data transfer over the data bus to the processor,
wherein the FPGA is responsive to respective logic signals set by the processor to start access to the serial flash memory by pointing to at least one predefined location corresponding to at least one starting address of data to be transferred to the processor without using a plurality of address lines to access the serial flash memory.

13. A method comprising:
storing data representative of boot code in serial flash memory;
emulating by a field-programmable gate array (FPGA), coupled between the serial flash memory and a processor, a parallel interface by converting a serial data stream comprising the data representative of the boot code received from the serial flash memory to a parallel data stream to effect parallel data transfer over a data bus to the processor; and
booting the processor with the data representative of the boot code by using respective logic signals set by the processor to start access to the serial flash memory by pointing to at least one predefined location corresponding to at least one starting address of the data representative of the boot code to be transferred to the processor via the FPGA without using a plurality of address lines to access the serial flash memory.

14. The method of claim 13, wherein the serial flash memory comprises a NOR-based serial flash memory.

15. The method of claim 13, wherein the data bus comprises an external memory interface (EMIF) bus.

16. The method of claim 13, wherein the FPGA is coupled to the serial flash memory by a quad serial interface.

17. The method of claim 13, further comprising:
receiving at a data buffer of the FPGA the data representative of the boot code from the serial flash memory; and
monitoring by the FPGA a storage level of the data buffer coupled to receive the data representative of the boot code being accessed from the serial flash memory by the processor.

18. The method of claim 17, wherein, when a number of words in the data buffer is below a lower range threshold, a plurality of wait commands are issued until the number of words in the data buffer refills to a predefined number of words.

19. The method of claim 18, wherein, when a number of words in the data buffer is above an upper range threshold, a plurality of halt commands are issued until the number of words in the data buffer is reduced to a predefined number of words.

20. A method comprising:
storing data representative of boot code in serial flash memory;
receiving at a data buffer the data representative of the boot code from the serial flash memory;
booting a processor, coupled to the data buffer, with the data representative of the boot code by using respective logic signals set by the processor to start access to the serial flash memory by pointing to at least one predefined location corresponding to at least one starting address of the data representative of the boot code to be transferred to the processor without using a plurality of address lines to access the serial flash memory; and
monitoring a storage level of the data buffer coupled to receive the data representative of the boot code being accessed from the serial flash memory by the processor.

21. the method of claim 20, further comprising:
emulating by a field-programmable gate array (FPGA), coupled between the serial flash memory and the processor, a parallel interface by converting a serial data stream comprising the data representative of the boot code received from the serial flash memory to a parallel data stream to effect parallel data transfer over a data bus to the processor, the FPGA comprising the data buffer.

\* \* \* \* \*